US009448716B2

(12) United States Patent
Coldefy et al.

(10) Patent No.: US 9,448,716 B2
(45) Date of Patent: Sep. 20, 2016

(54) PROCESS AND SYSTEM FOR MANAGEMENT OF A GRAPHICAL INTERFACE FOR THE DISPLAY OF APPLICATION SOFTWARE GRAPHICAL COMPONENTS (75) Inventors: François Coldefy, Lannion (FR); Mohammed Belatar, Safi, MA (US)

(73) Assignee: Orange, Paris (FR)

( * ) Notice: Subject to any disclaimer, the term of this patent is extended or adjusted under 35 U.S.C. 154(b) by 1139 days.

(21) Appl. No.: 12/914,286

(22) Filed: Oct. 28, 2010

(65) Prior Publication Data

US 2011/0119624 A1 May 19, 2011

(30) Foreign Application Priority Data

Oct. 28, 2009 (FR) ..................................... 09 57580

(51) Int. Cl.
  G06F 3/048 (2013.01)
  G06F 3/0488 (2013.01)
  G06F 3/01 (2006.01)
  G06F 3/0481 (2013.01)
  G06F 9/44 (2006.01)

(52) U.S. Cl.
  CPC ........... *G06F 3/04883* (2013.01); *G06F 3/017* (2013.01); *G06F 3/0481* (2013.01); *G06F 9/4443* (2013.01); *G06F 2203/04808* (2013.01)

(58) Field of Classification Search
  CPC ............... G06F 3/0488; G06F 3/3017; G06F 3/04883; G06F 2203/04808
  USPC .................................................. 715/810, 863
  See application file for complete search history.

(56) References Cited

U.S. PATENT DOCUMENTS 6,249,606 B1 *  6/2001  Kiraly et al. ................. 382/195
2007/0180400 A1 *  8/2007  Zotov et al. ................. 715/788
2007/0261003 A1 * 11/2007  Reissmueller ................ 715/810
2008/0168403 A1    7/2008  Westerman et al.
2009/0109187 A1 *  4/2009  Noma .......................... 345/173
2009/0231295 A1    9/2009  Petit et al.
2010/0005428 A1 *  1/2010  Ikeda et al. ................... 715/863

FOREIGN PATENT DOCUMENTS

EP  2101253 A1  9/2009

OTHER PUBLICATIONS

French Search Report, dated May 27, 2010, from corresponding French application.
Malik et al. (2005) Interacting with large displays from a distance with vision-tracked multi-finger gestural input. Department of Computer Science, University of Toronto.
The Tom Windows Manager (trade name, http://www.x.org/archive/X11R6.8.2/_doc/twm.1.html), or TWM, Technology. (Snapshot from Waybackmachine listed as Jun. 7, 2009, printed on Jan. 21, 2014).

* cited by examiner

*Primary Examiner* — Patrick Riegler
*Assistant Examiner* — Phuong Nguyen
(74) *Attorney, Agent, or Firm* — Knobbe Martens Olson & Bear LLP

(57) ABSTRACT

A process for the management of a graphical user interface (10) includes application software graphical components (26, 40, 40'), such as windows that display computer applications, displaying the data of an associated application software function. The process includes the stages of:
  tracing (E102), on the interface, a graphical shape (31, 31') in such a way as to create a graphical component (30, 30'),
  combining (E128) an application software function with the graphical component that was created for assigning the graphical component to the display of the application software function, and
  determining (E110) a direction (S) of the graphical component that is created in such a way as to display data of the associated application software function according to the determined direction.

16 Claims, 3 Drawing Sheets

PROCESS AND SYSTEM FOR MANAGEMENT OF A GRAPHICAL INTERFACE FOR THE DISPLAY OF APPLICATION SOFTWARE GRAPHICAL COMPONENTS

This invention relates to the management of a graphical user interface that comprises application software graphical components, such as computer applications windows or another component of an application.

In the computer field, a graphical user interface is generally formed by a set of graphical elements, generally in the form of pixels, which is displayed on a display device of a piece of electronic equipment and with which one or more users can interact by means of suitable peripherals. It is common to produce such a graphical user interface through a display device of the computer screen type, mobile equipment (such as a telephone), interactive table or tablet, touchscreen, whiteboard or else an interactive wall.

Both during a single-user use and during a multi-user use (where the graphical interface is shared simultaneously between several users), several application software graphical components that correspond to several computer applications can co-exist, side by side, for example, at the same time on the interface, more numerous than the interface is large.

Each application is represented by one or more application software graphical components, or "windows," dedicated to the display of all or part of the application software, such as, for example, a Windows (commercial name) window, a web browser, a document in an editing or display application, a software gadget (or "widget"), etc. These windows are generally displayed in a computer environment called the graphical user interface (GUI) that is combined with an operating system (OS) and that generally corresponds to the users' digital working space called an "office." An interface example is presented in the document "*Interacting with Large Displays from a Distance with Vision-Tracked Multi-Finger Gestural Input*" of Malik, Ranjan and Balakrishnan.

In a manner that is well known by all the practitioners, the launching, or "opening," of a new application ends in the creation of a new window on the graphical interface. This launching is generally achieved by an action of the user (click on an icon, on a button that represents the application, and even on a document to be displayed or to be edited, a selection from a menu or keyboard shortcut), which generates a command for opening the application. In response to this command, an application software window is opened on the graphical interface and is displayed in the "office," for example on a full screen or at a default location.

However, these mechanisms that are provided for the launching of applications generate application software graphical components on a graphical user interface without precise monitoring of the positioning of the latter or their dimensioning.

Risks of overlapping with other application software windows then exist, as well as possible inadequacy between the display dimensions of the window and the desires of the user. The latter is then to move the window into the desired location (to prevent, for example, overlapping of windows), optionally to rotate it to orient it in a particular direction (in the case of, for example, an interactive tablet to which the users have access from all sides), and optionally to resize it so that it does not encroach on its other application software windows or else to optimize its display surface relative to the available space.

The result is a large number of manipulation operations for the user so as to be in a situation to effectively use the launched applications. However, the succession of these operations tends to reduce the speed of interaction of the user with the system.

In addition, in a multi-user configuration, there is a risk of disturbing neighboring users that can disrupt work for the latter. Actually, when it is desired to open documents or to launch a new application, an attempt is made not to hinder other users by an overlapping of windows.

Furthermore, when a user, by a selection from a menu, an action that is not very perceptible by the other users of the same device, causes the sudden and uncontrolled opening in its positioning of a window, the other users are generally disturbed because they have not perceived the cause of the opening. Thus, the latter may wrongly think that they mistakenly caused this sudden appearance of the window.

In this multi-user context, the management of the interaction space between the users therefore takes on a certain importance.

There is therefore a need for improvement of the management of the launching of applications or the opening of any dedicated graphical component for offering to the user a positioning, a dimension and/or an orientation of the newly opened window that are adapted to the occupation status of the display space so as to preserve an acceptable view of the other windows that are already open in the "office" and/or not to disturb another user of the same display device.

The Tom Windows Manager (trade name, http://www.x.org/archiv/X11R6.8.2/doc/twm.1.html), or TWM, technology, which makes it possible, starting from an application that is chosen from a menu, to position and to open, on an interface, a corresponding application software window by choosing a first dot and by making the mouse slide up to another dot constituting the opposite tip of the window to be displayed, is known. Although this technology makes possible a more precise positioning and dimensioning of the window for a user, it has, however, several limitations, including in particular:

It is implemented only on single-user interfaces, whose display screen is oriented;
It requires the preliminary opening of a menu and makes final the assignment of the selected application in this menu to the window during construction;
It is dedicated exclusively to the opening of application software windows;
It limits the use of graphical space in rectangular zones.

There is also a need to improve the interaction of the user with a graphical user interface that is arranged to comprise application software graphical components, one application software graphical component displaying an associated application software function.

It was thus possible to provide the stages consisting in:
Tracing, on the interface, a graphical shape so as to create a graphical component, and then
Combining an application software function with said graphical component that was created to assign the graphical component to the display of said application software function.

"Application software function" is defined as any component/element of an application software digital unit that can have a determined function and appearance. By way of example, it may involve the application (software) itself to which a conventional window corresponds as mentioned above, but also toolboxes provided in such an application, commentary bubbles on a graphical component of a window, buttons or zones of text in a graphical editor, etc.

In this case, the user draws, on the display device, the shape of the graphical component for the application or the element of the application, exactly at the location where he desires to see it displayed, and in the corresponding display dimensions, in particular regarding its shape, its position, its orientation and its reading direction as described below. In this stage, the graphical component is undifferentiated; i.e., it is not associated with a particular application. A choice of the application to be associated can then be conducted, and then the application is associated with this graphical component that is drawn in such a way as to form a user interface of the application.

Compared to the known techniques, the creation of the graphical component, certainly undifferentiated, is, in this configuration, prior to the choice of the application. This reversal of the stages makes it possible in particular to reduce the number of manipulations for the user for improving the interaction and also for accelerating the process of opening applications under effective conditions of use of the interaction space.

Furthermore, the trace of the graphical shape by the user ensures optimum use of the display space upon the opening of the application because the user takes into account other open windows and the space available during his trace. It is thus easy not to disturb the other users.

Finally, these other users, since they see the user drawing on the graphical interface, can immediately see the cause of the appearance of a new graphical component and are not disturbed.

Such a monitoring of application software windows in an operating system is described in particular by the publication US 2007/0180400.

According to the latter, a user traces a geometric shape, such as a rectangle or a symbol, on the computer office, a shape from which the operating system determines the desired appearance of the application software window. The user next identifies the application that he desires to assign to this new window, for example through a dialogue box, from the Start menu, or by writing the name of the application to the office itself.

However, the monitoring described by the publication US 2007/0180400 is not entirely satisfactory, in particular because it is dedicated to single-user interfaces, whose display screen is oriented.

Actually, there are display devices that can be used by several users that are located on several sides of the device, for example interactive tablets around which the users arrange themselves.

Within this context, the purpose of this invention is to propose a solution that is suited both to single-user-oriented interfaces and to multi-user interfaces that are accessible from several sides.

For this purpose, the object of the invention is in particular a process as defined above, also comprising a stage for determination of a direction of the graphical component that is created in such a way as to display data of the associated application software function, in said application software graphical component, according to said determined direction.

It will be noted that the determination of the display direction is made while the graphical component is still undifferentiated.

According to the invention, the creation of application software windows in a way that is non-invasive toward other users of a multi-access graphical interface is made more precise.

In one embodiment of the invention, the process comprises a stage for recognition of a model graphical shape from the trace and a stage for display of said model graphical shape instead of the traced shape. This arrangement makes it possible to preserve a uniform and suitable display of the different application software windows. The result is an easier organization of windows on the interface.

According to a particular characteristic of the invention, said tracing stage comprises the tracing of a graphical shortcut. The graphical shortcut can be in particular a partial trace of the model graphical shape but also any simple shape to which the generally more complex graphical shape corresponds. This arrangement makes it possible to accelerate the launching of an application and therefore to improve the interactivity for the users.

In one embodiment, the traced geographical shape determines the dimensions, position and orientation of said graphical component that is displayed on the interface. The invention thereby imparts to the users a precise monitoring of the interaction space.

In one embodiment, said determination of the display direction is automatic based on said trace. It is therefore deduced, for example, in the way in which the graphical shape is traced. This automatic determination again improves the monitoring of the launching of a new application, and therefore the interaction of the user in the work environment.

As a variant, said determination of the orientation comprises a stage for indication, by a user, on the graphical interface, of said display direction.

In one embodiment of the invention, the process comprises a display stage of said graphical component that is created and a selection menu between at least two application software functions, and a stage for selection of a so-called application software function in such a way as to associate said selected application software function with the graphical component that is created.

Here, the invention makes it possible to display, after having made the trace of the graphical component, the possible choices for specialization of the graphical component that is then undifferentiated. This display can be automatic so as to improve the speed of interaction for the launching of applications and can take on different shapes such as clickable icons, a drop-down or scrolling menu, or any other menu that makes it possible to offer a number of possible choices in the selection.

In particular, said selection menu is displayed inside of said graphical component that was created. A possible risk of confusion is thus prevented when several new graphical components are launched simultaneously. In addition, the interaction is improved because at this moment, the user is concentrating on the zone that he is to draw.

According to a particular characteristic, the selection menu is based on the context of the graphical interface. "Context of the graphical interface" is defined as one or more pieces of information (graphics and/or content) that are present on the graphical interface and in the displayed applications. This arrangement makes it possible to reduce the number of entries of the selection menu to possible choices, taking said context into account. This restricted choice improves the visibility of the possible choices, the rapidity of selection, and therefore the launching of a new application software graphical component. This characteristic is useful in particular for the touch interfaces for which the size of icons or entries of the menu is conditioned by the size of the touch contact (finger or stylus).

In particular, the selection menu is based on the shape of the graphical component that is created. In this way, the user can voluntarily, by the single trace, restrict all of the application software functions (or specializations) that can be associated with the traced shape, thus promoting a faster launching.

As a variant or in combination, the selection menu is based on the display direction that is determined for the graphical component that is created. This arrangement can prove useful for certain uses of the display device. For example, in the case of an interactive table, it is possible to limit the accessible applications for one side of the table (for example for a student) and to allow a larger number of applications for the other side (for example a professor).

Other parameters can be taken into account, such as, for example the work environment or the other windows that are already open.

In one particular embodiment of the invention, the process comprises a recognition stage, starting from said trace, of a graphical shape with which is associated a single given application software function, and the association stage consists in associating said given application software function with the graphical component that is created from the recognized shape. This automatic assignment of an application software function by the shape makes it possible, by a single trace, to launch a new application software graphical component into the space that is delimited by said trace, be it complete or partial or via a graphical shortcut. In this configuration, the invention offers the greatest rapidity of controlled launching of a new application software function.

The invention also relates to a system for management of a graphical user interface that is arranged to comprise application software graphical components, and an application software graphical component that displays an associated application software function; the system comprises:

- A device for acquisition and display of a graphical shape that is traced by a user on the graphical user interface in such a way as to create a graphical component,
- A means of associating a computer application software function with said graphical component that is thus created to assign it to the display of said application software function, and
- A computer means that is configured for determining a direction of the graphical component that is created and for monitoring the display of the data of the application software function in the graphical component according to said determined direction.

The management system offers advantages that are similar to those of the management process disclosed above, in particular the one for improving the interaction in a digital working space of an accessible graphical interface by several users and for facilitating the launching of applications.

Optionally, the system can comprise means that relate to the characteristics of the process disclosed above.

The invention also relates to a means for storing data comprising instructions for a computer program that is suitable for implementing the management process according to the invention when this program is loaded and executed by a computer system.

The invention also relates to a computer program that can be read by a microprocessor, comprising instructions for the implementation of the management process according to the invention, when this program is loaded and executed by the microprocessor.

The means for storing data and the computer program exhibit characteristics and advantages that are analogous to the processes that they implement.

Other particular features and advantages of the invention will emerge in the description below, illustrated by the attached drawings, in which.

The launching of application software by the implementation of the invention is now described. The term "application software" combines both the concept of application (or software) designating the computer programs that are used to help the user in one of his activities and the concept of application software function designating an element (or function) of an application, such as, for example, a toolbox provided in the application, commentary bubbles on a graphical component of a window, buttons or text zones in a graphical editor, etc. Hereinafter, reference is made primarily to the applications, with one skilled in the art being able to implement adaptations that are necessary in the case of application software functions.

Figure 1A:
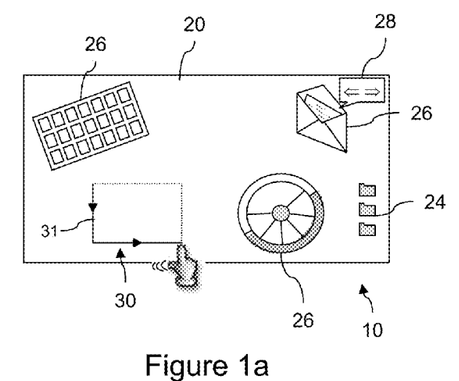
FIGS. 1a to 1g illustrate the launching of applications according to this invention.

As illustrated by FIG. 1a, the user deals with a graphical user interface 10 that is displayed on a computer display device that can take on the form of a computer screen, a mobile telephone, an interactive table or tablet, a whiteboard or else an interactive wall. Preferably, it involves a touch-type device that is sensitive to the finger of the user or to a stylus that is manipulated by the latter. Such a device type facilitates the tracing of graphical shapes, contrary to a mouse, and it is well known to one skilled in the art. It will therefore not be described in more detail.

As a variant, a pointing device, such as a mouse or a tactile pad ("touchpad") can be provided in a way that is made remote relative to the display device.

On the interface 10, the screen displays a computer office 20 that defines a digital working space (well known to one skilled in the art), which contains icons 24 that represent digital documents or applications, and application software windows 26 that display data from all or part of the content of applications during execution, for example, a document in the process of being edited, an open computer file or an e-mail box. In the case of application software functions of an application, corresponding graphical elements 28 (here, an arrow for responding to an e-mail and an arrow for transferring an e-mail) can also be displayed, and are the object of this invention, as introduced above.

In a way that is known in the art, the applications 26 are recorded in the memory of a processing device that is connected to the display device and are executed on the launch command. The user next interacts with one of these applications in the interface 10 at the associated window.

By way of example, a first window that shows a file explorer in which a set of photos appears at the level of a computer directory is shown here.

The user then desires to open a new application, for example a second directory to which he desires to transfer or copy the photos from the first directory.

According to the invention, the user will first specify the "physical" characteristics of the graphical component 30, or "window," which will be used to contain the new desired directory: its shape—which can be rectangular, round, etc.—its dimensions, its orientation, and its position. To do this, the user draws on the display device, with a finger or with another pointing device, the explicit contours 31 of the component exactly at the location where it is to be displayed and in the desired dimensions (FIG. 1a, the portion in dotted lines indicating the course of the trace that the user is going to produce). It is noted that to simplify the subsequent processing (in particular the automatic determination of the reading direction (see stage E110 of FIG. 2), a trace 31 is begun at a tip (if the shape comprises one).

Figure 1B:
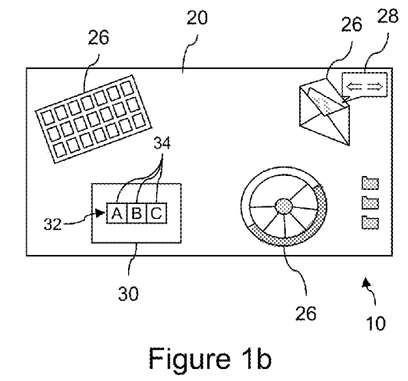

At this stage, the graphical component 30 is undifferentiated in that it is not associated with a particular application, in our example the file explorer. The undifferentiated graphical component 30 is displayed at the exact location where it was drawn, in the dimensions traced and in the orientation provided by the user (FIG. 1b). In a way that is known in the art for graphical interfaces, the user can move, redimension or reorient the graphical component that is created if necessary.

A menu 32 that offers the choices 34 of applications for specializing the graphical component 30 is then displayed close to the created component 30, preferably on the inside. In our example, the menu comprises three entries of which one corresponds to the file explorer (entry A in FIG. 1b). The menu that is offered can come in various forms: series of clickable icons, drop-down menu if the dimensions allow it, etc.

Figure 1C:
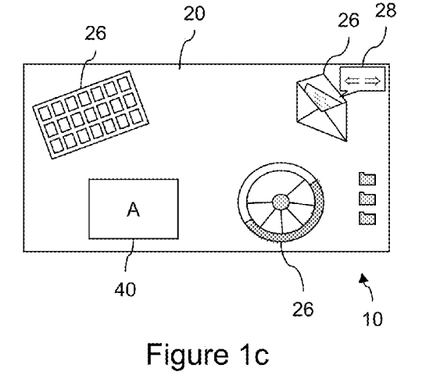

The user then selects the entry of the desired menu, here entry A, using his finger or an ad hoc pointing device. The application targeted by the selected entry is then assigned to the undifferentiated graphical component 30, specializing it in its definitive application software usage. A conventional application software window 40 is thus obtained (FIG. 1c) that, in our example, displays a file explorer, and which is equivalent to the already existing windows 26. The user thus places—side by side—two source directories and a target for moving the photos.

Figure 1D:
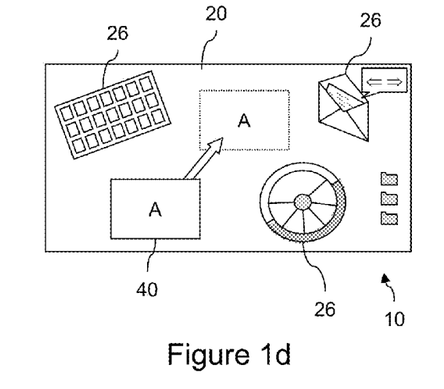

The user then conventionally uses the graphical interface 10 and the new application software window 40 that is created: closing of windows, movement of windows (FIG. 1d), window rotation, use of an application through a particular window 26, etc.

Figure 1E:
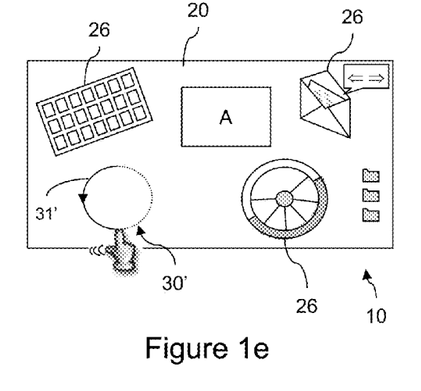
Figure 1F:
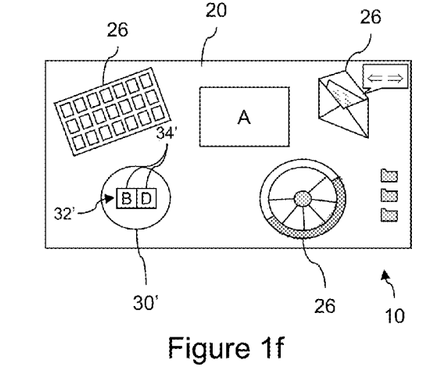
Figure 1G:
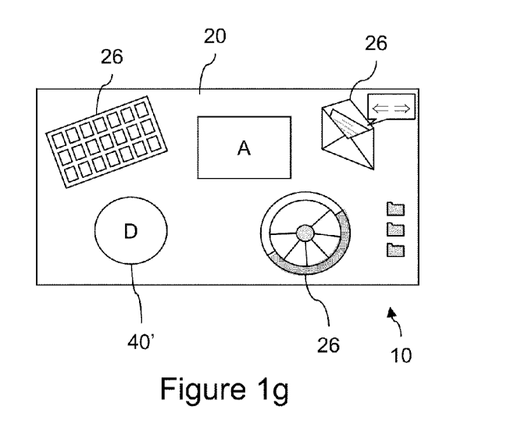

The same user or another user can then decide to open a new application software window 40', this time round in shape, by first tracing the circular graphical component 30' (FIG. 1e), and by choosing the application that is desired through a new menu 32' (FIG. 1f) so as to obtain the specialized application software window 40' (FIG. 1g).

By choosing—in the process for creation of the application window—its shape, its location, its orientation, and its dimensions, the user can easily not interfere with the portion of working space used by another user of the same display device and can also, for personal use, directly organize his windows in an optimal way based on the desired use.

Figure 2:
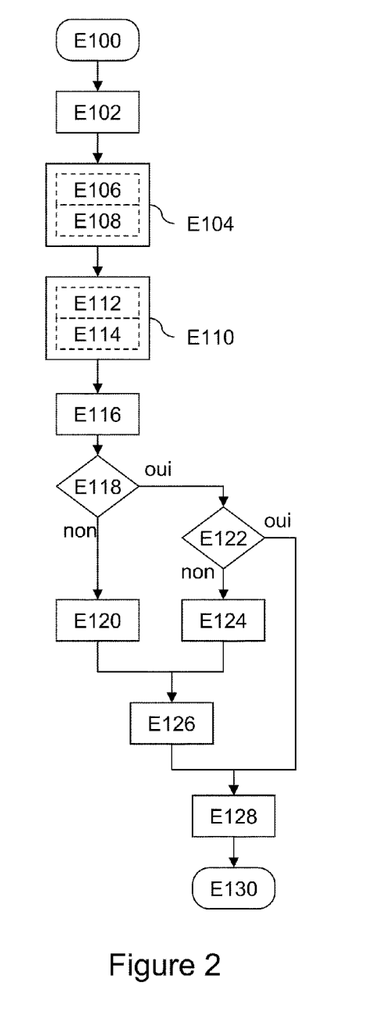
FIG. 2 shows, in flow-chart form, general stages of the process according to the invention.

With reference to FIG. 2, the stages of the process according to the invention for launching a new application on a touch interactive tablet, for example, of the capacitive type, will now be described. These stages are implemented in particular by software executed in the device that controls the display, for example the operational system that also manages the working space, in relation to the guides or microcontrollers of the devices that are implemented (screen, pointing, memory, etc.).

In stage E100, a user arranges a digital working space 20 that already optionally contains open application software windows 26 or other icons.

In stage E102, the user chooses, in the working space, a virgin region of graphical components or elements in such a way as to draw there the shape of a new component 30 using his finger on the tactile touchscreen of the interactive tablet.

The capacitive circuits and the acquisition software that are provided periodically acquire the coordinates of the user's finger that moves on the touchscreen. The successive dots (sampling the trace that is produced 31) are recorded in a memory of the system until the user raises his finger. At this time, the acquisition is considered to be terminated, and the system has recorded the trace 31 on the fly, which is displayed on the display device.

With the optional stage E104, the system initiates automatic recognition of the traced shape 31 by the user. Several recognitions can be implemented alternately or in combination.

On the one hand, it may involve a recognition E106 for the purpose of an automatic correction of the trace. Thus, it is possible to obtain a uniform graphical restoration of the graphical components.

In this case, the trace 31, recorded in the form of a dot list, is transmitted to an analysis module for identifying the shape that it is intended to represent.

Figure 3:
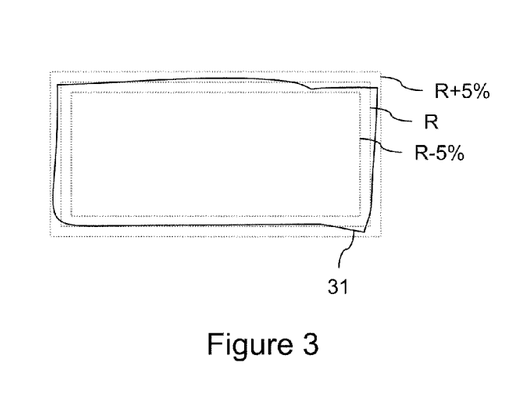
FIG. 3 illustrates the recognition of a model graphical shape, implemented in the process of FIG. 2.

By way of example as illustrated in FIG. 3, this analysis can be conducted by comparison (with homothetics and rotation, if necessary) between the traced shape and the elementary model shapes (rectangle, circle, triangle). The traced shape 31 is compared to a model R and to homothetics of this model (here +/−5%). The shape 31 is considered to be representative of the model R if the entire trace 31 is included between the two homothetics R−5% and R+5%. Of course, other analytical approaches and other parameters (+/−5%) can be implemented within the scope of this invention.

Once the model graphical shape R is identified, the system extracts from it the geometric characteristics that are useful in particular for implementing a display at minimum cost of the graphical component 30 by simple transmission of these characteristics: for a rectangle, the width, the height, an angle of rotation (orientation), and the position of its center; for the circle, the radius and the position of its center; for a triangle, the position of the three tips.

In the existing systems, a trace that encompasses graphical elements or components generally has the object of initiating a selection (in the computer sense of the term) of said components/elements. Within this context, the system can also provide for identifying whether at least one already existing graphical component/element 26/24 is included inside the trace, in which case a selection method as known is activated. Moreover, if no graphical component/element is detected inside the trace 31, the process according to the invention continues.

Another automatic recognition E108 relates to the use of gestural shortcuts or "partial traces." This encompasses both the trace of only a portion of the desired shape and the trace of a particular shape with which a predefined shape is associated. For the implementation of the invention, these partial traces make it possible to specify the set of data necessary to the positioning of the graphical component 30, to its dimensions, and to its orientation.

Figure 4A:
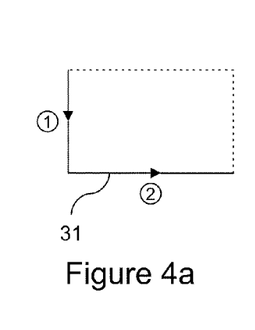
FIGS. 4a and 4b illustrate the principle of a partial trace.

By way of example, it is possible, to create a component 30 of rectangular shape, to be content with tracing half of the contour (FIG. 4a). Actually, the traced height and width make it possible to determine all of the information that is necessary to the display. The system, if it detects a non-closed trace, can thus, by simple interpolation rules, determine the closed shape (dotted lines in the figure).

Figure 4B:
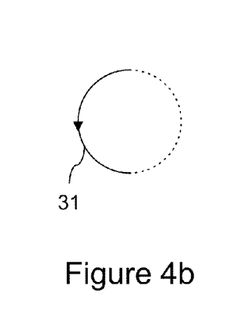

In a similar manner, for a component that is circular in shape, it is also possible to be content with tracing only a half-circle (FIG. 4b).

Other more or less complex cases can be taken into consideration: closing the partial shape by a line between the two ends (making it possible, for example, to trace only two sides of a triangle), and tracing a particular symbol (for example "+") for designating a particular shape (for example a square that frames the symbol "+").

It will be noted that in the case where stage E104 is not carried out, the traced shape 31 is essentially closed and is used, as such, as a graphical component 30.

The process of FIG. 2 continues in stage E110 by the determination of the reading direction of the traced graphical component 30, optionally corrected in regular form.

Actually, the component 30 is designed to host an application that displays text or images, for example, with therefore a preferred reading direction. The simple indication of shape does not specify, for example for the rectangle, whether the component is in the landscape or portrait reading mode or in what direction. It is also noted that, if, on a vertical computer screen, the concept of reading direction is immediate, this is not the case for an interactive tablet or a board around which the users can arrange themselves.

An automatic determination and a manual determination are then taken into consideration in an alternate manner.

In the case of a manual determination, in stage E112, the user indicates the reading direction in the graphical component 30, for example by a line that indicates the top of reading at its starting end and the bottom of reading at its arrival end. In stage E114, the system interprets the drawn line to determine the top and the bottom of reading. These data are recorded in the system to allow the subsequent display of an application in the component 30 that is drawn in the good reading direction.

In the case of an automatic determination, stage E112 is not carried out, and in stage E114, the system implicitly deduces the reading direction from the trace 31.

Figure 5A:
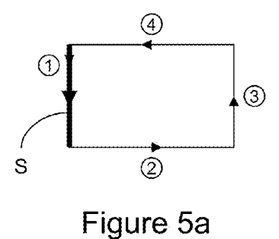
FIGS. 5a to 5d illustrate an example for determining the reading direction of graphical components, implemented in FIG. 2.
Figure 5B:
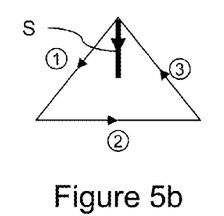
Figure 5C:
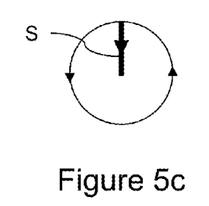
Figure 5D:
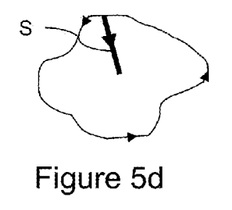

A choice by agreement is made in advance. By way of example, for the rectangle, the reading direction S is provided by the direction of the first traced side (see the thick arrow in FIG. 5a); for the triangle, the reading direction S is provided by the direction of the vector that connects the first tip to the center of the triangle (FIG. 5b); for the circle, it is the direction that connects the first dot of the trace to the center of the circle (FIG. 5c); for any shape, the reading direction S can be given by the given direction of the first traced dot in the center of the shape (for example, the isobarycenter of the dots that constitute the shape) whose contour has been regularly re-sampled along the curvilinear abscissa (FIG. 5d).

The system can then display (stage E116) the regular graphical component 30 on the display device instead of the trace 31. At this stage of the process, the graphical component 30 is undifferentiated.

In stage E118, it is determined whether there is a restricted set of available applications that are specifically associated with a shape such as the one that is traced and oriented 30. To initiate this determination, it is possible to use a conversion table that is pre-filled and that associates a set of possible applications, optionally a single application, with each shape.

Stage E118 then consists in determining whether there is, in this table, an entry that is associated with the traced and oriented shape 30.

If not, the system displays, in stage E120, a menu 32 that comprises all of the applications of the system and not a sub-assembly. As specified above, this menu can consist of, for example, a set of clickable icons, a drop-down menu of entries or a scrolling menu (the menu is stretched with one hand, and an entry is chosen with the other) and can be positioned either inside the graphical component 30, or in the close vicinity of the latter.

In the affirmative case of stage E118, the system determines, in stage E122, whether the identified entry comprises a single possible application. In other words, it is determined here whether the traced and oriented shape 30 corresponds to a single possible application.

By way of example, this may be the case for complex drawn graphical shapes that can be associated directly with an application.

A spiral trace (FIG. 6) can be used, for example, to draw a circular component (the largest circle contained in the spiral) and to indicate, because the shape is a spiral (for Example 1, one and one-half rotations), a specific application without passing by the menu 32. This approach makes it possible, in a single trace, to summarize:
The application to be launched, and
The position, the orientation, the dimensions, and the reading direction of the application software window 40.

Figure 6:
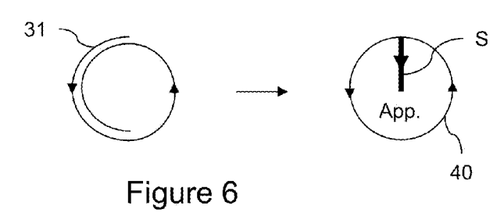
FIG. 6 illustrates an example of a complex trace that is associated directly with a specialized application software graphical component.

By acting on a parameter of the trace 31 (for example, the number of turns of the spiral), the invention allows a direct choice between several applications for the same shape.

If several applications are possible (output, no from stage E122), the system displays, in stage E124 and in a similar way in stage E120, the restricted set of possible applications under the form of a menu 32.

This display E120/E124 is illustrated in particular by the above-mentioned FIGS. 1b and 1f.

It is seen here that by reducing the number of possible entries of selection menu 32, a smaller menu is displayed that constitutes an advantage for the touch interfaces for which the size of the graphical elements (here, the entries) depends on the size of the touch contact. Typically, fewer graphical entries are put into a touch drop-down menu than on a traditional keyboard/mouse interface.

The invention is not limited, however, to the association between a traced shape and a set of applications. Other contextual parameters of the digital working space can be taken into account, in combination or alternately:
  The shape of the drawn component 30: for example, a set of possible applications is associated with a rectangle, and another separate set of applications is associated with a circle;
  The reading direction of the drawn component 30: In this way, it is possible to allow or to prevent certain applications based on the location of the user from all sides of the interactive tablet;
  The location of the component 30: the working space can be divided into several zones, each one being associated with a set of possible applications:
  The direction of the trace 31: clockwise or counterclockwise;
  The dimensions of the drawn component 30;

The nature of the "active" window during the opening of the new application. This is the case in particular when the new graphical component that is created is dedicated to a function of an "active" application, for example for displaying tool bars;

The nature of other open applications in the working space, etc.

By way of illustration, an example of a table combining a context and possible applications is shown below.

| Context | Possible Applications |
|---|---|
| Traced Shape: Triangle | A, C, E |
| Traced Shape: Rectangle | A, B, C |
| Traced Shape: Circular | B, D |
| Shape in the Upper Part | A, B, D, E |
| Shape in the Lower Part | A, B, C, E |
| Active Window: Email Box | B, D |
| Active Window: File Explorer | A, B, D |
| Active Window: Web Browser | A, C, E |

If several contextual criteria are taken into account in combination, the applications that are offered in the menu are those that result from the intersection of sets of applications for each criterion adopted.

Following stages E120 and E124, the user selects an entry from menu 32, during stage E126.

The application that is thus selected (stage E126) or automatically associated with the drawn shape (output, yes, from stage E122) is assigned, in stage E128, to the drawn graphical component 30 in such a way as to specialize it. The result is an application software graphical component 40, i.e., a conventional application software window, in the drawn shape (see FIGS. 1c and 1g) and that displays the selected application.

The process ends in stage E130 where the user uses the working space in a conventional way. Stage E130 is similar to stage E100.

Of course, on the multi-user display devices, the process according to the invention can be implemented simultaneously by several users in such a way as to launch, for each of them, a new application. With the multi-user management being known to one skilled in the art, it will not be described in more detail here.

Thus, the invention makes it possible to position, orient and dimension more easily and more quickly an application software graphical component (application software window) on the graphical interface. This imparts a better interaction, in particular:

When the graphical interface requires using several open windows or application software graphical components (sorting of photos, for example, when photos from different sources are to be transferred into a target directory);

When work is done on an interactive table with other users and management of the interaction space is to be conducted in a collective way. By drawing the graphical component just like the table, The other users are then implicitly warned from action and are not surprised by the appearance of a new graphical component for launching a new application, The invention makes it possible to prevent the visual overlapping with other components that are used by these other users, By being able to choose any desired oriented shape (in TWM, only the rectangles that are already oriented vertically are provided), the working space can be better exploited.

Figure 7:
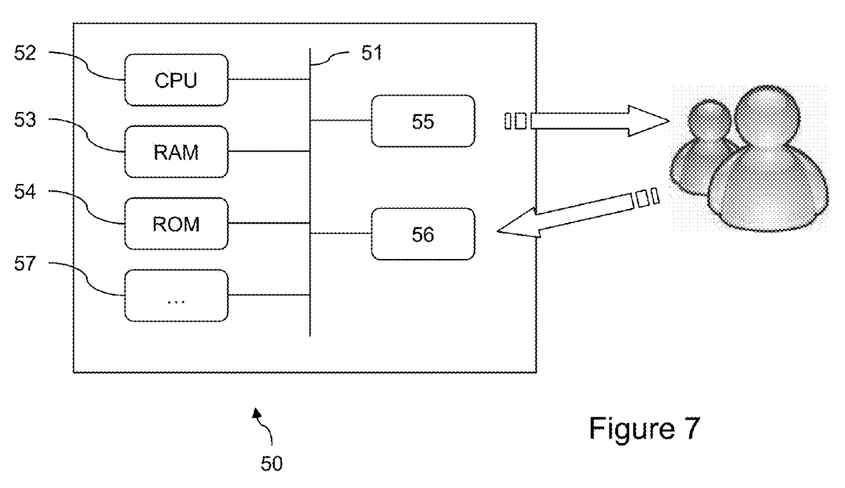
FIG. 7 shows a special hardware configuration of a device that is capable of implementing the process according to the invention.

FIG. 7 shows diagrammatically a system 50 for the implementation of the invention.

System 50 comprises a communication bus 51 to which are connected a central processing unit or "microprocessor" 52, a random-access memory 53, a read-only memory 54, a display device 55, a pointing device 56, and optionally other peripherals 57 (communication interface, floppy disk or disk reader, etc.).

The read-only memory 54 comprises programs whose execution makes possible the implementation of the process according to the invention as well as the executable files of the applications that are implemented through application software windows. The read-only memory 54 is also provided for recording the dots of traces 51, conversion tables, etc.

During the execution of the programs, the executable code of the latter is loaded in the RAM-type random access memory 53 and executed by the microprocessor 52. This execution makes possible the display of the digital working space, application software windows, as well as the execution, strictly speaking, of the applications displayed in these windows.

The display device 55, such as a screen, an LCD touchscreen or a video-projector, makes possible the display of the graphical user interface by which the user displays the execution of the applications and interacts.

The pointing device 56 can be integrated in the display device, in particular when it is a matter of a touchscreen, or made remote, for example a mouse, a touchpad, or else a graphical tablet.

The device that is described here and, particularly, the central unit 52 are able to implement all or part of the processing cycles described in connection with FIGS. 1 to 6 for implementing the processes that are the objects of this invention, and can constitute the systems that are the objects of this invention.

The preceding examples are only embodiments of the invention that is not limited thereto.

The invention claimed is:

1. A process for management of a graphical user interface displayed on a screen of a device adapted for use by a plurality of users, the graphical user interface being arranged for comprising application software graphical components, one application software graphical component displaying an associated application software function, the process comprising:

tracing, on the interface, a graphical shape, creating, from the graphical shape, a window, wherein the traced graphical shape determines the shape, orientation, and dimensions of the window, associating an application software function with said window that was created, and displaying said application software function in said window, wherein said process further comprises determining a reading direction of the window, said reading direction depending on a location of a user relative to the screen, wherein the location of the user relative to the screen is determined according to a side from which the user accesses the screen and wherein certain applications are prevented or allowed based on the side from which the user accesses the screen, and wherein the display of the associated application software function in the window comprises the display of data of said application software function in said window in said determined reading direction.

2. The process according to claim 1, further comprising recognizing a model graphical shape from the trace and displaying said model graphical shape instead of the traced shape.

3. The process according to claim 2, wherein said tracing comprises the tracing of a graphical shortcut.

4. The process according to claim 1, wherein the side from which the user accesses the screen is determined automatically based on said traced graphical shape.

5. The process according to claim 4, wherein the side from which the user accesses the screen is defined by the direction that is given between a first dot that is traced and a center of the traced graphical shape.

6. The process according to claim 4, wherein for a rectangle-type traced graphical shape, the side from which the user accesses the screen is defined by the direction of a first traced side.

7. The process according to claim 1, wherein the side from which the user accesses the screen is defined by, in addition to the tracing of the graphical shape, an indication by the user on the graphical interface of said display direction.

8. The process according to claim 7, wherein the side from which the user accesses the screen is defined by tracing, by the user and inside of the window, of a line whose starting end and arrival end relatively define the top and the bottom of the display.

9. The process according to claim 1, comprising a displaying said window that is created and selecting between at least two application software functions on a menu,
and selecting an application software function in such a way as to associate said selected application software function with the window that is created.

10. The process according to claim 9, wherein said selection menu is displayed inside of said window that is created.

11. The process according to claim 9, wherein the selection on said menu is based on the shape of the window that is created.

12. The process according to claim 9, wherein the selection menu is based on said display direction that is determined for the window that is created.

13. The process of claim 1, wherein the screen is divided into several zones, each zone being associated with a set of several applications so that the position on the screen where the graphical shape is traced determines a set of applications that can be launched.

14. A system for management of a graphical user interface displayed on a screen of a device adapted for use by a plurality of users, the graphical user interface being arranged for comprising application software windows, one application software window displaying an associated application software function, the system comprising:
a device for acquisition and display of a graphical shape that is traced by a user on the graphical user interface in such a way as to create a window, which shape, orientation, dimensions and position are determined by the traced graphical shape, and
a microprocessor configured to associate a computer application software function with said window that is thus created to display said application software function in said window,
wherein the microprocessor is further configured for determining a reading direction of the window that is created, said reading direction depending on a location of a user relative to the screen, and for monitoring the display of data of the application software function in the window according to said determined reading direction, wherein the location of the user relative to the screen is determined according to a side from which the user accesses the screen and wherein said microprocessor is configured for allowing or preventing certain applications based on the side from which the user accesses the screen.

15. The system of claim 14, wherein the screen is divided into several zones, each zone being associated with a set of several applications and wherein the microprocessor is configured to determine a set of applications that can be launched based upon the position on the screen where the graphical shape is traced.

16. A non-transitory computer readable medium comprising instructions stored thereon for implementing the process for management according to claim 1, when said instructions are executed by a computer.

* * * * *

UNITED STATES PATENT AND TRADEMARK OFFICE
CERTIFICATE OF CORRECTION

PATENT NO. : 9,448,716 B2
APPLICATION NO. : 12/914286
DATED : September 20, 2016
INVENTOR(S) : Francois Coldefy It is certified that error appears in the above-identified patent and that said Letters Patent is hereby corrected as shown below:

In the Specification

In Column 2 at Line 30, Change "archiv" to --archive--.

In the Claims

In Column 13 at Line 30 (approx.), In Claim 9, after "comprising" delete "a".

Signed and Sealed this
Thirteenth Day of March, 2018

Andrei Iancu
*Director of the United States Patent and Trademark Office*